United States Patent [19]

Ogino et al.

[11] 4,346,010

[45] Aug. 24, 1982

[54] PROCESS FOR RECOVERING FINE COAL PARTICLES FROM SLURRY OF FINELY DIVIDED COAL

[75] Inventors: Etsuo Ogino; Nobuo Yoshii; Kazuo Harada, all of Osaka, Japan

[73] Assignee: Hitachi Shipbuilding & Engineering Co., Ltd., Osaka, Japan

[21] Appl. No.: 251,700

[22] Filed: Apr. 7, 1981

[30] Foreign Application Priority Data

Apr. 14, 1980 [JP] Japan .................................. 55-49654

[51] Int. Cl.³ .................................................. C02F 1/54

[52] U.S. Cl. .................................... 210/714; 210/723; 210/729; 209/5; 209/49

[58] Field of Search ....................... 209/5, 49; 210/714, 210/723, 729, 730; 44/24, 10 R

[56] References Cited

U.S. PATENT DOCUMENTS

| | | | |
|---|---|---|---|
| 1,421,862 | 7/1922 | Trent | 209/49 |
| 3,045,818 | 7/1962 | Muschenborn et al. | 209/5 X |
| 3,230,282 | 1/1966 | Campagne et al. | 209/5 X |
| 3,268,071 | 8/1966 | Puddington et al. | 209/5 |
| 3,856,668 | 12/1974 | Shubert | 209/5 X |
| 4,248,697 | 2/1981 | Halvorsen | 209/5 |
| 4,255,155 | 3/1981 | Frankovich | 44/24 X |

*Primary Examiner*—Ralph J. Hill

*Attorney, Agent, or Firm*—Allison C. Collard; Thomas M. Galgano

[57] ABSTRACT

Fine coal particles are recovered from a slurry of finely divided coal by mixing coarsely divided coal and a binder together to cause the binder to adhere to the surfaces of the coarsely divided coal pieces, mixing the slurry with the coal pieces having the binder adhered thereto to cause fine coal particles to adhere to the binder over the surfaces of the coal pieces serving as nuclei and thereby form agglomerates, and separating the agglomerates from the remaining slurry portion to recover the fine coal particles along with the coarsely divided coal and the binder.

6 Claims, 2 Drawing Figures

PROCESS FOR RECOVERING FINE COAL PARTICLES FROM SLURRY OF FINELY DIVIDED COAL

BACKGROUND OF THE INVENTION

The present invention relates to a process for recovering fine coal particles from slurries of finely divided coal.

Slurries consisting only of water and finely divided coal of the order of microns in particle size are transported generally through relatively short pipelines under some process conditions. After such a slurry has been transported, there is the need to dewater and dry the slurry for the recovery of the coal. When the slurry of finely divided coal is dewatered with a filter, the filter will become clogged up, resulting in a greatly reduced dewatering efficiency. The slurry has other problems in that it requires a long period of time for drying and is likely to release fines as dust. Although it appears useful to mix fuel oil or like binder directly with the slurry of fine coal particles to granulate the particles, it is difficult to adhere the binder to the coal particles, which are extremely minute, and therefore, to granulate the particles. Furthermore, it takes a great deal of time to obtain sufficiently large granules or pellets, while there is the necessity of using a large amount of binder since finely divided coal has a large surface area per unit weight. Consequently the method described fails to recover fine coal particles efficiently.

SUMMARY OF THE INVENTION

The object of this invention is to overcome the foregoing problems and to provide a process for recovering fine coal particles from slurries of finely divided coal. The process comprises the steps of mixing coarsely divided coal and a binder together to cause the binder to adhere to the surfaces of the coarsely divided coal pieces, mixing a slurry of finely divided coal with the coarse coal pieces having the binder adhered thereto to cause fine coal particles to adhere to the binder over the surfaces of the coal pieces serving as nuclei and thereby form agglomerates, and separating the agglomerates from the remaining slurry portion to recover the fine coal particles along with the coarsely divided coal and the binder. Since agglomerates of coal are formed by causing fine coal particles in the slurry to adhere to the binder covering the surfaces of the coarse coal pieces which serve as nuclei, the agglomerates can be formed very rapidly. Because the coarsely divided coal has a smaller surface area per unit weight than the finely divided coal, the amount of the binder needed is smaller. As a result, fine coal particles can be recovered from the slurry of finely divided coal very smoothly and efficiently.

The present invention will be described in greater detail with reference to the accompanying drawings;

PREFERRED EMBODIMENT OF THE INVENTION

Figure 1:
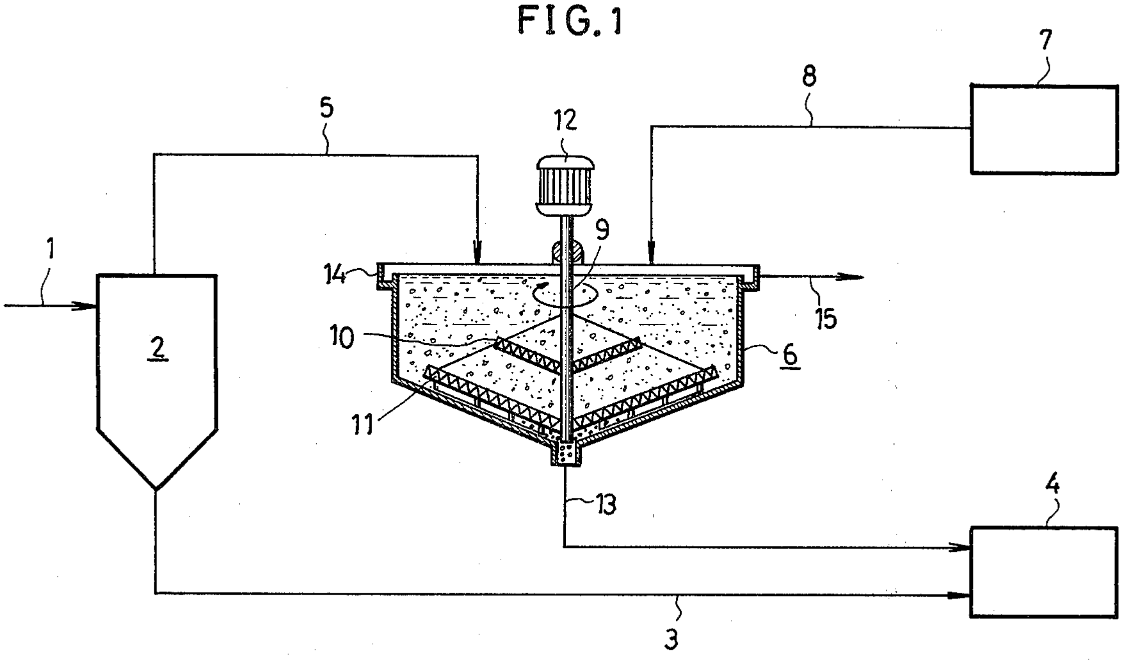
FIG. 1 is a diagram showing the piping system of an apparatus for practicing the process of the invention.
Figure 2:
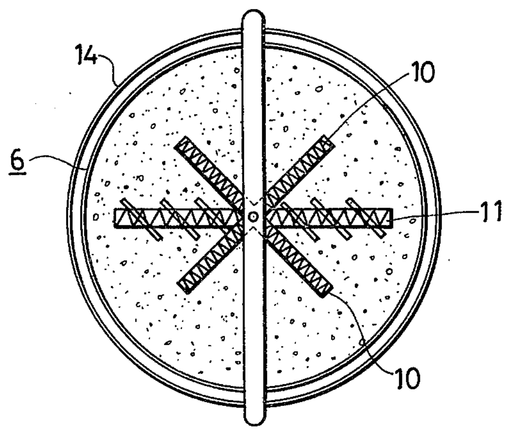
FIG. 2 is a plan view showing a thickener included in the apparatus of FIG. 1.

With reference to FIGS. 1 and 2, a slurry comprising finely divided coal, for example, up to 500μ in particle size and dispersed in water in led through a feed pipe 1 into the upper end of a liquid cyclone 2, in which relatively coarse coal particles included in the finely divided coal of the slurry are separated off. The coarse coal particles are drawn off from the bottom of the cyclone 2 and sent through a first duct 3 to a storage tank 4. The remaining slurry fraction of fine particles which are not separable by the cyclone 2 is discharged from the top of the cyclone 2 and led through a second duct 5 into a thickener 6. On the other hand, fuel oil or like binder is admixed in a mixer 7 with coarsely divided coal larger than 500μ but not larger than 25 mm, preferably about 2 to about 20 mm, in size. The coal and the binder are mixed together by agitation. The binder is used in an amount of about 5 to about 15% by weight based on the coarsely divided coal. Since coal and oil generally have affinity for each other, fuel oil or like binder adheres to the surfaces of the coarsely divided coal pieces including particulate to granular pieces and lumps. Examples of useful binders are fuel oil, kerosene, gas oil, residuum oil, vegetable oils, etc. The coarse coal pieces having the binder adhered thereto are then placed into the slurry of fine coal particles in the thickener 6 by way of a third duct 8.

The thickener 6 has four upper stirring blades 10 attached to an upper portion of a rotary shaft 9 and arranged in the form of a cross when seen from thereabove, and two lower stirring blades 11 of the raking type attached to the lower end of the rotary shaft 9 and disposed close to the tapered bottom wall of the thickener. These stirring blades 10 and 11 are driven by a motor 12 to mix the fine particle coal slurry with the coarse coal pieces having the binder adhered thereto, whereby fine coal particles are held in or adhered to the binder covering the surfaces of the coarse coal pieces. Thus agglomerates of coal are formed from the coarse pieces and the fine particles adhering to the coarse pieces which serve as nuclei. The agglomerates are collected on the bottom of the thickener 6 by the two lower stirring blades 11, drawn off through a fourth duct 13 connected to the bottom wall of the thickener 6 and sent to the storage tank 4.

The agglomerates thus recovered comprise coarse coal pieces, binder and fine coal particles and have sizes which are suitable for the subsequent dewatering and drying steps for recovering the coal particles.

The supernatant in the thickener 6 is run off through a discharge pipe 15 via an overflow trough 14.

The present invention may be embodied differently without departing from the spirit and basic features of the invention. Accordingly, the embodiment herein disclosed is given for illustrative purposes only and is in no way limitative. It is to be understood that the scope of the invention is defined by the appended claims rather than by the specification, and that various alterations and modifications within the definition and scope of the claims are included in the claims.

What is claimed is:

1. A process for recovering fine coal particles from a slurry of finely-divided coal, comprising the steps of:

mixing coarsely divided coal and a binder together to cause the binder to adhere to the surfaces of the coarsely divided coal pieces;

thereafter mixing the slurry of the finely-divided coal with the coal pieces having the binder adhered thereto to cause fine coal particles to adhere to the binder over the surfaces of the coal pieces serving as nuclei so as to thereby form agglomerates; and subsequently separating the agglomerates from the remaining slurry portion to recover the fine coal particles along with the coarsely divided coal and the binder.

2. A process as defined in claim 1 wherein the coarsely divided coal pieces are larger than 500μ but not larger than 25 mm.

3. A process as defined in claim 1 wherein the finely divided coal of the slurry is up to 500μ in particle size.

4. A process as defined in claim 1, wherein the binder is selected from the group consisting of fuel oil, kerosene, gas oil, residuum oil and vegetable oil.

5. A process as defined in claim 1 wherein the binder is used in an amount of 5 to 15% by weight based on the coarsely divided coal.

6. A process as defined in claim 1, wherein as an initial step, feeding a slurry comprising finely-divided coal pieces dispersed in water to a liquid cyclone and separating off the relatively course coal particles included in the finely-divided coal pieces in the slurry.

* * * * *